United States Patent
Myers

(10) Patent No.: US 10,105,005 B2
(45) Date of Patent: Oct. 23, 2018

(54) CONVENIENT COOKWARE

(71) Applicant: Roberta O. Myers, Ordinary, VA (US)

(72) Inventor: Roberta O. Myers, Ordinary, VA (US)

( * ) Notice: Subject to any disclaimer, the term of this patent is extended or adjusted under 35 U.S.C. 154(b) by 0 days.

(21) Appl. No.: 15/216,707

(22) Filed: Jul. 22, 2016

(65) Prior Publication Data

US 2018/0020870 A1    Jan. 25, 2018

(51) Int. Cl.
*A47J 36/10*    (2006.01)
*A47J 36/02*    (2006.01)

(52) U.S. Cl.
CPC .............. *A47J 36/10* (2013.01); *A47J 36/02* (2013.01)

(58) Field of Classification Search
CPC ............ A47J 33/00; A47J 36/02–36/42; A47J 37/00–37/1295
USPC ............................. 220/810–849, 573.1–573.5
See application file for complete search history.

(56) References Cited

U.S. PATENT DOCUMENTS

| | | | | |
|---|---|---|---|---|
| 5,463,795 A | * | 11/1995 | Carlson | E05D 5/14 16/273 |
| 6,618,902 B2 | * | 9/2003 | Wu | E05F 1/1215 16/273 |
| 6,619,192 B2 | * | 9/2003 | Lee | A47J 37/0611 220/4.24 |
| 2009/0218359 A1 | * | 9/2009 | Repetti, III | A47J 36/00 220/694 |
| 2011/0296652 A1 | * | 12/2011 | Zhang | E05D 7/0027 16/239 |
| 2012/0273512 A1 | * | 11/2012 | Dai | A47J 36/12 220/832 |
| 2016/0183720 A1 | * | 6/2016 | Yan | A47J 37/0611 99/376 |

OTHER PUBLICATIONS

Hamilton Beach Indoor Grill with Removable Grids on Walmart. com's online catalog.

* cited by examiner

*Primary Examiner* — Kareen Thomas
(74) *Attorney, Agent, or Firm* — SciNova LLC; Jingfeng Song

(57) ABSTRACT

A cookware has a lid, a cooking vessel, and a hinge that connects both the lid and the cooking vessel together. The hinge is movable and permanently installed on the lid and the cooking vessel. Both the lid and the cooking vessel stay together during cooking and storage.

5 Claims, 1 Drawing Sheet

CONVENIENT COOKWARE

BACKGROUND OF THE INVENTION

Cooking vessels such as pots and pans have been widely used in kitchens for food preparation. Although a lid is not necessary to be in every cooking when a pot or pan is used, it is customarily made to fit the cooking vessel that it is attached to and they are usually sold together.

As a cooking utensil with the design for covering or blocking, a lid can be applied in different cooking scenario or for various household purposes when users see fit. In addition, a lid is an independent cooking piece separated from the cooking vessel. Therefore, it can be moved around within the cooking area or even taken away for outdoor usage. Although all potential applications mentioned above show how flexible the use of a lid can be, it does create a practical issue: the lid is either missing or can't be found at the time when it is needed for the use of the cooking vessel that it is attached to.

People try to put the cooking vessel and the lid together to avoid this issue. An interchangeable lid has also been developed so that it can be used for substitution when the original one is missing. However, these measures are unable to completely solve this issue because the lid remains separated from the cooking vessel in these solutions. As long as the lid is not physically bound to the cooking vessel, there is still a possibility or potential that it is taken away from the cooking vessel.

Therefore, it is very much needed in the art to have a cookware that comprises a lid that is connected to the cooking vessel. While locating a lid is not an issue anymore for such cookware, the binding of the lid to the cooking vessel should not materially affect the fun and enjoyment of cooking. These issues are addressed and solved in the current invention.

BRIEF SUMMARY OF THE INVENTION

The current invention relates to a cookware that comprises a lid, a cooking vessel, and a hinge that connect the lid and the cooking vessel together. Because the hinge is installed on both the lid and the cooking vessel, the cooking vessel can be either opened or covered by moving the lid up from or down to the cooking vessel. In some embodiments of the invention, the cooking vessel is a pot. In other embodiments of the invention, the cooking vessel is a pan. In some particular embodiments of the invention, the hinge is installed to the cookware by rivets or screws. In some other particular embodiment of the invention, the hinge is installed to the cookware by welding. In some more particular embodiments of the invention, the cookware is made of stainless steel. In some other more particular embodiments of the invention, the lid comprises glass material.

DETAILED DESCRIPTION OF THE INVENTION

The current invention pertains to a convenient cookware comprising a lid, a cooking vessel, and a hinge that connects both the lid and the cooking vessel together. The cooking vessel is a metal container such as a pot or pan used in kitchen for food preparation under the high temperature. The cooking vessel is preferably made of stainless steel. It may also be made of other metals such as iron, copper or titanium with or without non-stick coating. At least one handle is attached to the vessel so that a user is able to move the cooking vessel to or away from a stove by holding the handle. The shape of the cooking vessel varies as long as it is able to hold food for cooking. The lid is a cover for the opening of the cooking vessel. The lid is made of metal and preferably stainless steel. It can be also be made of glass. The lid may vary in shape and size for covering the cooking vessel in different embodiments. The hinge is made of metal and preferably stainless steel. It comprises a pin and two leaves that have at least one knuckle on each of them. Each leaf is installed on the exterior surface of the lid or the cook vessel. Both leaves are connected to each other through the pin and the knuckle. The hinge is movable around the pin. The lid can be moved up or down so that it is able to open or cover the cooking vessel while remaining connected with the vessel.

Figure 1:
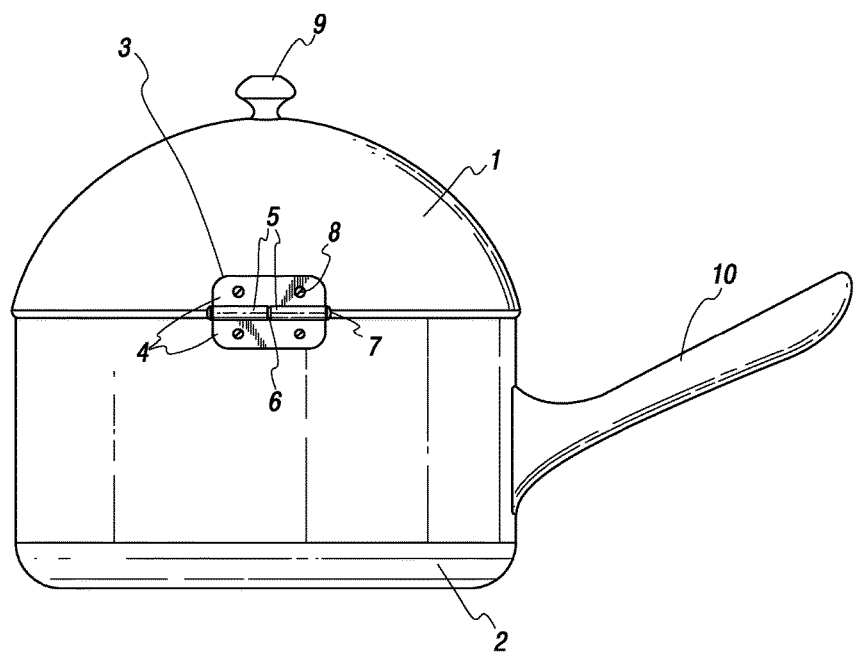
FIG. 1 shows a cookware having a lid, a cooking pot, a hinge, a knob, and a handle.

One preferred embodiment of the convenient cookware is shown in FIG. 1. The cooking vessel is a stainless steel pot 2 with a handle 10 attached to it. A stainless steel lid 1 covers the opening of the pot 2. In some other embodiments of the invention, the lid may be made of glass or metal materials other than stainless steel and has other types of shape as long as it is able to cover the opening of a pot. The hinge 3 has two leaves 4, which are two pieces of stainless steel. Each of these leaves has screw holes and is attached firmly to the exterior surface of the lid 1 or the pot 2 by screws 8. The shape and size of the leaf in other embodiments may be different from 4 as long as it can fit perfectly on the surface of the cookware. In some other embodiments of the invention, these leaves can be installed on the cookware by rivets or welds. Every leaf has one knuckle 5, which is a hollow joint with a cylindrical shape. A pin 6, which is cylinder shaped, passes through the hollow space of both knuckles and permanently stays inside the knuckles with non-removable pin caps 7 installed at both ends of the pin. When the lid 1 is moved up and down by holding a knob 9 for opening and closing the pot 2, the knuckle 5 is turned circularly back and forth around the pin. In some other embodiments of the invention, the cap at one end of the pin is removable so that the pin can be taken out and the lid is able to be separated from the cooking vessel. As seen in FIG. 1, the hinge 3 is installed to the cooking pot 2 at a position away from the handle 4. In some other embodiments of the invention, the hinge 3 may be installed at other positions on the exterior surface of the pot 4. One of these other positions is at the area right above the place where the handle 4 is attached. In this embodiment, the lid 1 may lay on the handle 10 when it is opened.

Figure 2:
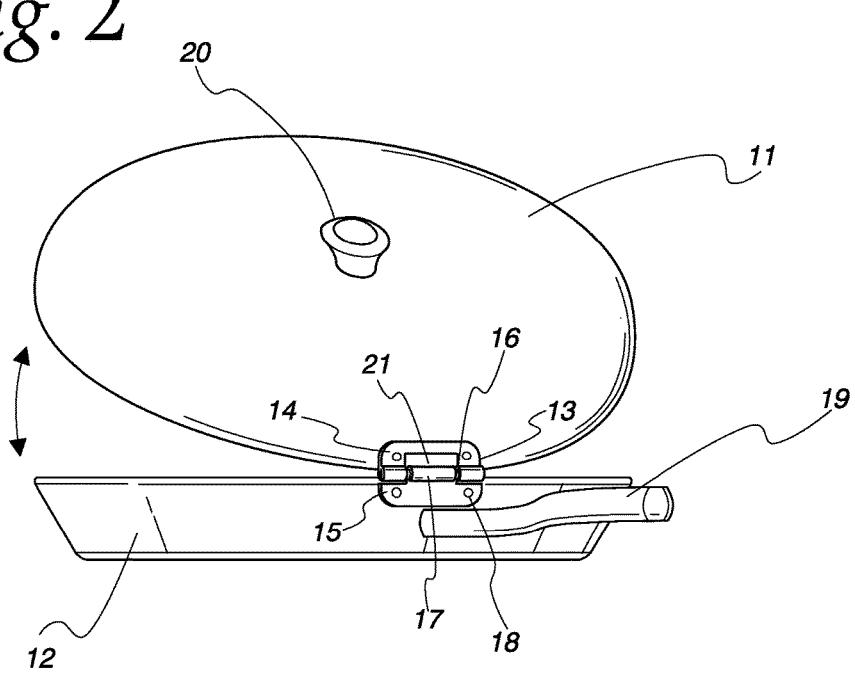
FIG. 2 shows a cookware having a lid, a cooking pan, a hinge, a knob, and a handle.

Another preferred embodiment of the current invention is shown in FIG. 2. The cookware has a lid 11, a cooking pan 12, and a hinge 13 that connects both the lid 11 and the cooking pan 12 together. A knob 20 is installed near the center of the lid 11. The hinge 13 has rivet holes and is installed by rivets 18 to the cooking pan 12 at the position right above the handle 19. The hinge 13 is made of stainless steel in this preferred embodiment and has two leaves 14 and 15. An opening 21 forms near the middle of the leaf 14, which separates the leaf 14 into two sides. As shown in FIG. 2, there is a pin 16 on the side without the rivet holes. A knuckle 17, which becomes an integral part of the leaf 15 and has a cylindrical shape, is hollow. The pin 16 passes through and stays in the hollow space of the knuckle 17. Both leaves 14 and 15 are connected with each other through the pin 16 and the knuckle 17. The hinge 13 is movable. When the lid 11 is opened by lifting up the knob 20, the knuckle 17 circularly moved around the pin 16. After the lid 11 is fully opened, it may lay on the handle 19. In other embodiments of the invention, the hinge may be installed at other positions of the cooking pan so that the lid does not completely rest on the handle when it is opened. The hinge 13 may be made of other metals such as copper, aluminum, or titanium. Other types of hinges, such as those described in Paragraph 0009, may also be used in the embodiments comprising a cooking pan.

What is claimed is:

1. A cookware comprising a lid, a cooking vessel, and a hinge that connects both the lid and the cooking vessel together by rivets, wherein the lid, the cooking vessel, and the hinge are made of stainless steel; the hinge comprises a pin, two pin caps, and two independent leaves; one leaf is installed on the lid and the other leaf is installed on the cooking vessel; both leaves have at least one hollow knuckle; and the pin passes through knuckles on both leaves with pin caps at both ends of the pin.

2. A cookware as described in claim 1 wherein one pin cap is removable.

3. A cookware as described in claim 1 wherein two pin caps are non-removable.

4. A cookware as described in claim 3 wherein each of the two independent leaves has one hollow knuckle.

5. A cookware as described in claim 1 wherein the hinge comprises two independent leaves; one leaf is installed on the lid and another leaf is installed on the cooking vessel; one leaf has a hollow knuckle and the other leaf has a pin; and the pin passes through and stays within the knuckle.

* * * * *